(12) United States Patent
Nugent

(10) Patent No.: US 12,706,891 B2
(45) Date of Patent: Aug. 11, 2026

(54) TUNNELED REMOTE INTENT MECHANISM

(71) Applicant: Thomson Licensing, Cesson-Sevigne (FR)

(72) Inventor: Paul Adrian Nugent, Larne (GB)

(73) Assignee: Thomson Licensing, Cesson-Sevigne (FR)

( * ) Notice: Subject to any disclaimer, the term of this patent is extended or adjusted under 35 U.S.C. 154(b) by 134 days.

(21) Appl. No.: 18/120,503

(22) Filed: Mar. 13, 2023

(65) Prior Publication Data

US 2023/0300118 A1 Sep. 21, 2023

Related U.S. Application Data

(60) Provisional application No. 63/321,261, filed on Mar. 18, 2022.

(51) Int. Cl.
*H04L 9/40* (2022.01)

(52) U.S. Cl.
CPC ........ *H04L 63/0435* (2013.01); *H04L 63/029* (2013.01)

(58) Field of Classification Search
None
See application file for complete search history.

(56) References Cited

U.S. PATENT DOCUMENTS 10,075,439 B1 * 9/2018 Mullens ................ H04L 63/126
2012/0282900 A1 * 11/2012 Zhang ................ H04L 41/0856 455/411
2019/0104033 A1 * 4/2019 Carey ..................... H04W 4/70
2020/0228330 A1 7/2020 Zhuang et al.
2021/0034537 A1 * 2/2021 Shuster ............... G06F 9/45558
2021/0092097 A1 * 3/2021 Law .................... H04L 63/0227
2023/0131132 A1 * 4/2023 Dion ................... G06F 9/45558 380/255
2023/0328493 A1 * 10/2023 Hayes ..................... H04W 4/50 455/418

FOREIGN PATENT DOCUMENTS

CN 108259601 A * 7/2018 ......... G06F 13/4282
CN 110213340 9/2019

(Continued)

OTHER PUBLICATIONS

QA_Cafe—"CDRouter 11.0—QA Café Support" publication date—Sep. 4, 2018—(QA_Cafe hereinafter)—https://support.qacafe.com/cdrouter/release-notes/11/cdrouter-11-0-release-notes/ (Year: 2018).*

(Continued)

*Primary Examiner* — Younes Naji
(74) *Attorney, Agent, or Firm* — James Shead; David Todd Shoneman; Michael A. Pugel

(57) ABSTRACT

Customer premise equipment for receiving tunneled commands from a device management platform to execute. A remote management client is configured to establish a tunneled connection with a device management platform, to receive an encrypted command from the device management platform via the tunneled connection, and to decrypt the encrypted command to generate an unencrypted command. A command interface is configured to receive the unencrypted command from the remote management client, and to execute the command.

16 Claims, 5 Drawing Sheets

(56) References Cited

FOREIGN PATENT DOCUMENTS

| | | | | | |
|---|---|---|---|---|---|
| CN | 110213340 A | * | 9/2019 | ......... | H04L 41/0893 |
| CN | 110557318 | | 12/2019 | | |
| CN | 112788782 A | * | 5/2021 | ............ | H04W 12/08 |

OTHER PUBLICATIONS

International Search Report and Written Opinion issued Jun. 27, 2023 in International Application No. PCT/US2023/015067.

Savić et al., "Implementation of TR-069 connection request mechanism," International Symposium on Industrial Electronics INDEL 2014, Banja Luka, Nov. 6-8, 2014, pp. 262-265.

Stusek et al., "Remote management of intelligent devices: Using TR-069 protocol in IoT," In2016 39th International Conference on Telecommunications and Signal Processing (ISP) IEEE, Jun. 27, 2016, pp. 74-78.

Xu et al., "Security enhancement of secure USB debugging in Android system," In2015 12th Annual IEEE Consumer Communications and Networking Conference (CCNC) IEEE, Jan. 9, 2015, pp. 134-139.

International Preliminary Report on Patentability dated Sep. 24, 2024 in International (PCT) Application No. PCT/US2023/015067.

* cited by examiner

TUNNELED REMOTE INTENT MECHANISM

BACKGROUND

The subject matter of the present disclosure relates generally to tunneling commands from a device management platform to customer premise equipment (CPE) to provide execution of the commands at the CPE.

Command line tools are scripts, programs, and libraries that have been created with a unique purpose, typically to solve a problem such as debugging a particular type of device. There are different command line tools for various categories, such as web development, utilities, productivity, and others, and some command line tools are designed for specific operating systems, e.g., Windows, Android, OSX, Linux, UNIX, etc.

Command line tools provide an alternative to using the administrative interface for various operations. Performing administrative tasks using a command line tool is typically faster and less tedious than in the general user interface. Scripts can be written that combine commands to automate more complicated tasks. Command line tools also may provide additional functionality not available via the administrative interface.

An increasing number of devices operate using any one of several variants of the Android operating system, including variants intended for phones, tablets, smart TVs, smart media devices, and set-top boxes. The Android operating system is also used in a range of other electronics, such as game consoles, digital cameras, portable media players, Android TV for televisions, and Wear OS for wearables. The Android operating system supports a logical interface, accessible through a USB port or other wired interface of a device, which can be used for debugging and development. The interface, referred to as the ADB (Android Debug Bridge). ADB is a multifunctional command line tool, and is an application program in a client-server mode, and can be used to manage a simulator or real equipment connected with a development computer, check logs and Debug information, and realize some automation and script functions.

The ADB is used for debugging a device in a USB (Universal Serial Bus) mode and a wireless mode. In the USB mode, a USB data line is needed to establish the connection between the client and the mobile equipment; in the wireless mode, if the ADB is adopted to default the self-contained remote connection, the client and the mobile device need to be in the same network segment, otherwise, the connection between the client and the mobile device cannot be established. Thus, a remote device cannot access ADB, which is inconvenient for service providers.

SUMMARY

An aspect of the present disclosure involves a system and method to tunnel commands from a device management platform to customer premise equipment (CPE) to provide execution of the commands at the CPE.

Customer premise equipment (CPE) device may include a memory storing computer-readable instructions, and a processor configured to execute the computer-readable instructions to provide a remote management client configured to establish a tunneled connection with a device management platform, to receive an encrypted command from the device management platform via the tunnel connection, and to decrypt the encrypted command to generate an unencrypted command, and a command interface configured to receive the unencrypted command from the remote management client, and to execute the command.

The encrypted command is communicated to the remote management client via one of a TR-069 (Technical Report 069) protocol and a TR-369 (Technical Report 369) protocol.

The command interface may be implemented as an Android Debug Bridge (ADB), and wherein the encrypted command may specify a predetermined IP port for the ADB.

The remote management client may include one of a Customer Premise Equipment (CPE) Wide Area Network (WAN) Management Protocol (CWMP) client and a user services platform (USP) agent.

The tunneled connection may include one of a Customer Premise Equipment (CPE) Wide Area Network (WAN) Management Protocol (CWMP) communications connection and a user services platform (USP) communications connection.

The encrypted command may include at least one of an ADB shell command and an ADB intent command.

The encrypted command may be a security wrapped command.

The device management platform may include a controller providing one of an auto-configuration server (ACS) and a user services platform (USP) controller.

Commands received at a customer premise equipment from a device management platform are able capable of being executed at a command interface by establishing a tunneled connection between a remote management client and a device management platform, receiving at the remote management client an encrypted command from the device management platform via the tunnel connection, decrypting the encrypted command at the remote management client to generate an unencrypted command, providing the unencrypted command by the remote management client to a command interface, and executing the command at the command interface.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to tunneling commands from a device management platform to customer premise equipment (CPE) to provide execution of the commands by a command interface at the CPE.

Figure 1:
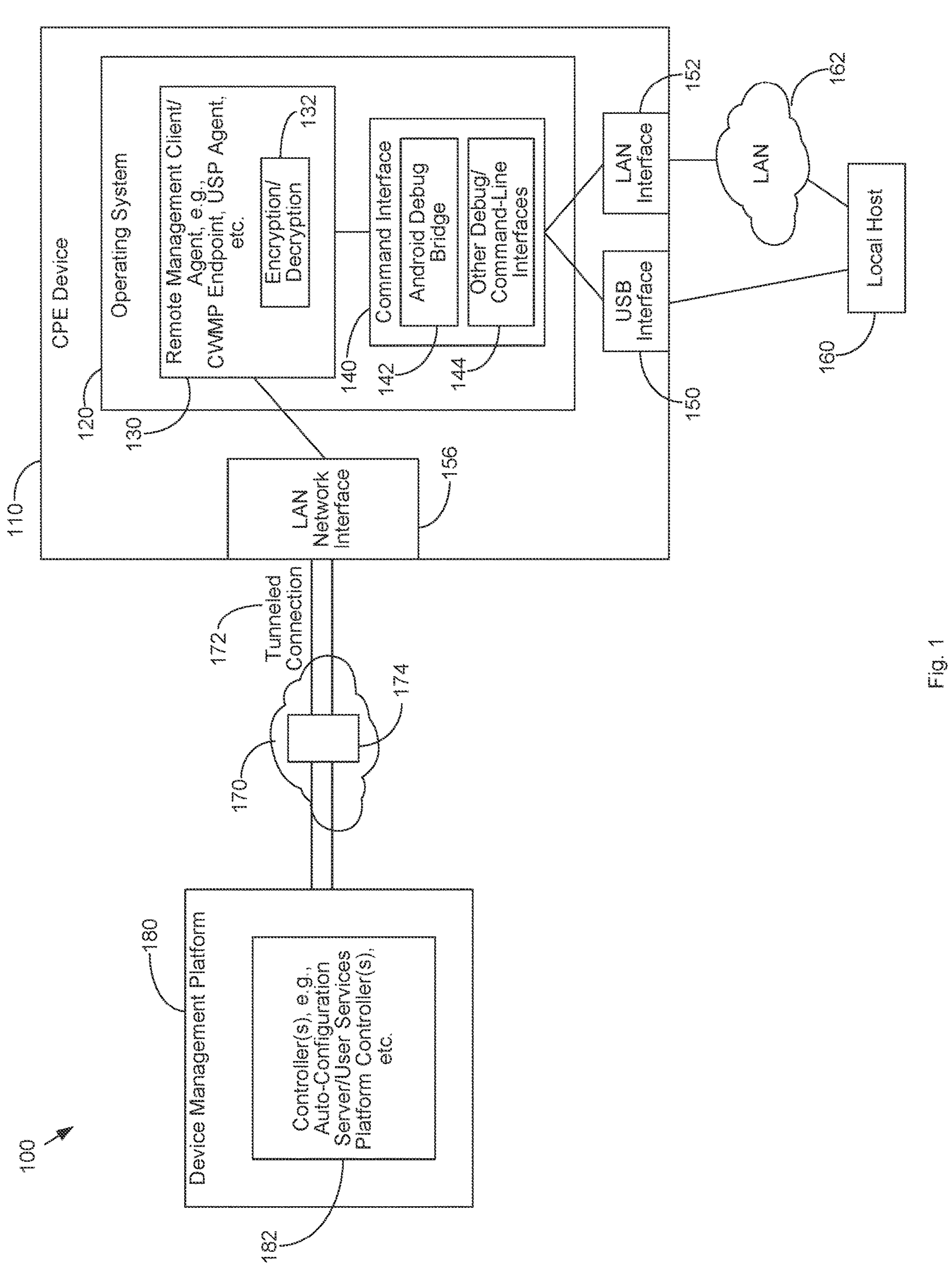
FIG. 1 illustrates a system for tunneling commands from a device management platform to customer premise equipment (CPE) to provide execution of the commands by a command interface at the CPE.

FIG. 1 illustrates a system 100 for tunneling commands from a device management platform to customer premise equipment (CPE) to provide execution of the commands by a command interface at the CPE.

In FIG. 1, a CPE device 110 is illustrated as used, for example, in a consumer's location. Non-limiting examples of CPE 110 may include set-top boxes (STBs), smart media devices (SMDs), routers, network switches, Residential Gateways (RG), high-speed cable modems, extenders, fixed mobile convergence products, home networking adapters and Internet access gateways, Digital Subscriber Line (DSL) or other broadband Internet routers, Voice over Internet Protocol (VoIP) stations, etc. However, herein a STB may be used interchangeably, without limitation to describe the CPE 110. CPE 110 provides functions using an Operating System 120. For example, Operating System 120 may be an Android operation system as commonly used on mobile devices or an Android TV operating system used for television sets, digital media players, set-top boxes, soundbars, etc.

CPE 110 includes a Remote Management Client/Agent 130, such as a CPE Wide Area Network (WAN) Management Protocol (CWMP) Endpoint Agent, USP Agent, etc. To be able to process commends at Command Interface 140, encrypted command message are received by CPE Device 110 at LAN Network Interface 156 from one or more Controllers of Device Management Platform 180. LAN Network Interface 156 may also be able to send response messages to Controllers of Device Management Platform 180. Such messages may be sent or received over a Tunneled Connection 172, such as a TR-069 or TR-369 connection. Tunneled Connection 172 may be wired, or wireless, and may be formed using a tunneling protocol that allows private network communications to be sent across a public network (such as the Internet) through a process called encapsulation where packets are wrapped inside of other packets. Some common tunneling protocols include IP in IP (IPv4/IPv6), Generic Routing Encapsulation (GRE) Protocol, Secure Socket Tunneling Protocol, IPSec (Internet Protocol Security) protocol, L2TP Layer 2 Tunneling, Layer Two Tunneling Protocol (L2TP), Point-to-Point Tunneling Protocol (PPTP), HTTP tunneling using SSL or TLS (i.e. HTTPS), etc. To provide the encapsulation or wrapping of a packet to provide Tunnel Connection 172, Remote Management Client/Agent 130 may provide Encryption/Decryption 132.

Remote Management Client/Agent 130 unwraps a received command packet and provides the unwrapped/decrypted command to Command Interface 140. The Command Interface 140 may then execute the unwrapped/decrypted command provided the Command Interface by the Remote Management Client/Agent 130. For example, Command Interface 140 may be an Android Debug Bridge (ADB) 142. When Operating System 120 is an Android operating system, such as Android TV, it provides the ADB 142 that can be used for debugging and development. However, Operating System 120 may provide Other Debug/Command-Line Interfaces 144 instead of, or in addition to, ADB 142.

As shown in FIG. 1, Device Management Platform 180 is capable of communicating with CPE device, for example, through a Network 170, e.g., a wide area network such the Internet, cable distribution system, DSL network, etc. CPE 110 includes LAN Network Interface 156 which can access Network 170 through several types of Access Points (AP) 174, such as residential gateways (RG), high-speed cable modems, fixed mobile convergence products, digital subscriber line (DSL) or other broadband Internet routers, etc., Device Management Platform 180 includes one or more Controllers 182, such as an Auto-Configuration Server (ACS) or User Services Platform (USP) Controllers.

To provide commands to Commands Interface 140, a Local Client/Host 160 needs to be connected to CPE 110 through USB interface 150 or through a wireless connection through LAN interface 152. However, for wireless connections, Local Host 160 and CPE 110 need to be in the same network segment, such as LAN 162. Otherwise, access to Command Interface 140 cannot be established. Thus, a remote device, such as Device Management Platform 180, cannot access Command Interface 140, such as ADB 142. To overcome this issue, commands, such as ADB commands, are tunneled from Device Management Platform 180 to CPE 110, where Remote Management Client/Agent 130 unwraps/decrypts the commands and provides the commands to the Command Interface 140 to provide execution of the commands at the CPE 110. Remote Management Client/Agent 130 receives results from the Command Interface 140, wraps/encrypts the results, and provides the wrapped results to the Controllers 182 of Device Management Platform 180.

As mentioned, packets may be sent or received over a Tunneled Connection 172, such as a TR-069 or TR-369 connection. TR-069 describes a protocol for communication between a CPE 110 and Controller 182, i.e., ACS. A CWMP Client Endpoint is provided by Remote Management Client/Agent 130 and is used by the CPE 110 for session communication with the ACS 182. The TR-069 Tunneled Connection 172 prevents tampering with the transactions that take place between the CPE 110 and ACS 182, provide confidentiality for these transactions, and allow various levels of authentication. To provide for execution of Android Debug Bridge (ADB) commands, the ADB commands are tunneled from the ACS 182 to the CPE 110 (e.g., a STB) via the TR-069 Tunneled Connection 172. The ADB commands may include at least one of an ADB shell command and an ADB intent command.

The same mechanism can be applied to other operating systems of CPEs 110 that offer a command line based environment which can be remotely accessed via a secure tunnel formed by the TR-069 Tunneled Connection 172

The Tunneled Connection 172 may also be implemented according to the TR-369 protocol. The TR-369 protocol provides for multiple controllers endpoints, e.g., User Services Platform Controllers of Controller 182, with different permission settings that can be subscribed to by USP Agent, i.e., Remote Management Client/Agent 130. With CWMP the connection between the CWMP client and the ACS is always initiated by the CWMP client for a specific purpose and optimized to be as short as possible. However, TR-369 provides for an always-on, direct communication. Once a TR-369 Tunneled Connection 172 is established at the start-up, sessions are open indefinitely and the User Services Platform Controllers of Controller 182 can freely send messages to USP Agent, i.e., Remote Management Client/

Agent 130. USP messages are wrapped in a USP record can be encrypted with TLS. USP messages may also be secured at Controller 182 in MTPs, which support at least one of several protocols to secure USP Messages.

Accordingly, TR-369 provides for execution of commands sent by USP Controller 182 to USP Agent 130, such as Android Debug Bridge (ADB) commands. ADB commands may be tunneled between one of the USP Controllers 182 and USP Agent 130 of CPE 110 (e.g., a STB) via TR-369 Tunneled Connection 172. Any response from USP Agent 130 of CPE 110 may also be tunneled to one of the USP Controllers 182 via TR-369 Tunneled Connection 172. The same mechanism can be applied to other operating systems of CPEs 110 that offer a command line based environment which can be remotely accessed via a secure tunnel formed by the TR-369 Tunneled Connection 172

Figure 2:
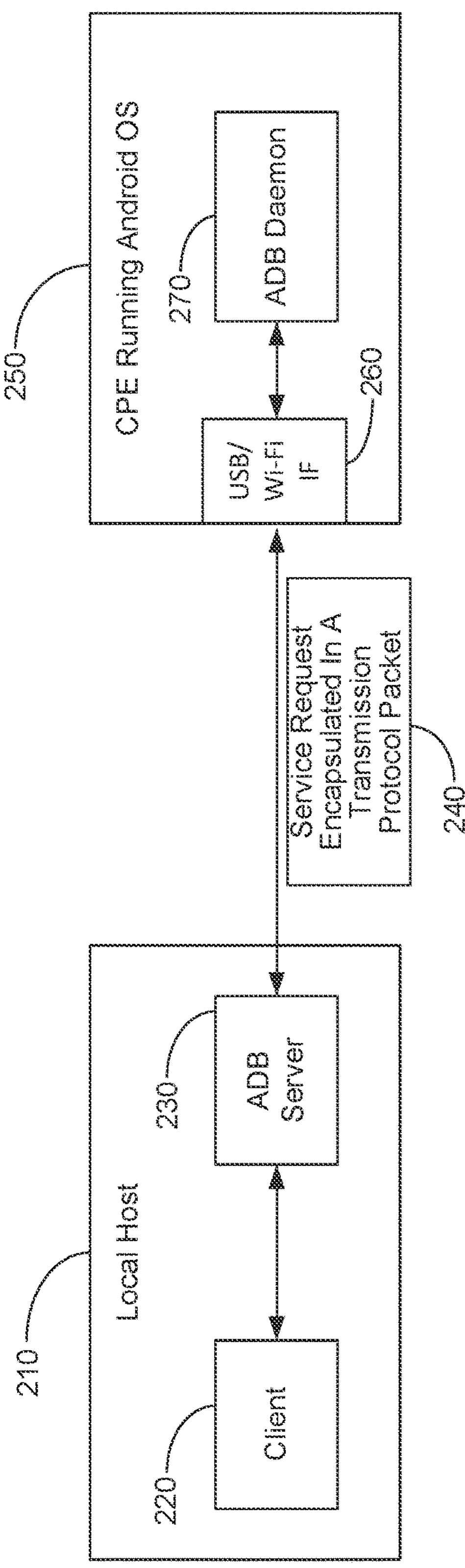
FIG. 2 is an architectural diagram of local ADB data transmission.

FIG. 2 is an architectural diagram of local ADB data transmission 200.

In FIG. 2, an ADB Client 220 runs on a Local Host 210. ADB Client 220 generates an ADB service request packet after parsing a command input by a user and sending the request to an ADB Server 230 through a local socket. The ADB Server 230 also runs on the Local Host 210. The ADB Server 230 parses and replies to the service request of the ADB Client 220. If the service request needs to be completed in coordination with an Android device, the ADB Server 230 initiates a service request to a CPE running Android OS 250, e.g., Android device. The ADB Server 230 sends Service Request Encapsulated Into A Transmission Protocol packet 240, and interacts with the CPE 250 through a USB Interface or local Wi-Fi interface 260. An ADB Daemon 270 runs on the CPE 250. The ADB Daemon 270 parses the sends Service Request Encapsulated Into A Transmission Protocol packet 240 on the USB interface/Wi-Fi Interface 260 and responds to the sends Service Request Encapsulated Into A Transmission Protocol packet 240 sent by the ADB Server 230.

Figures 3, 4:
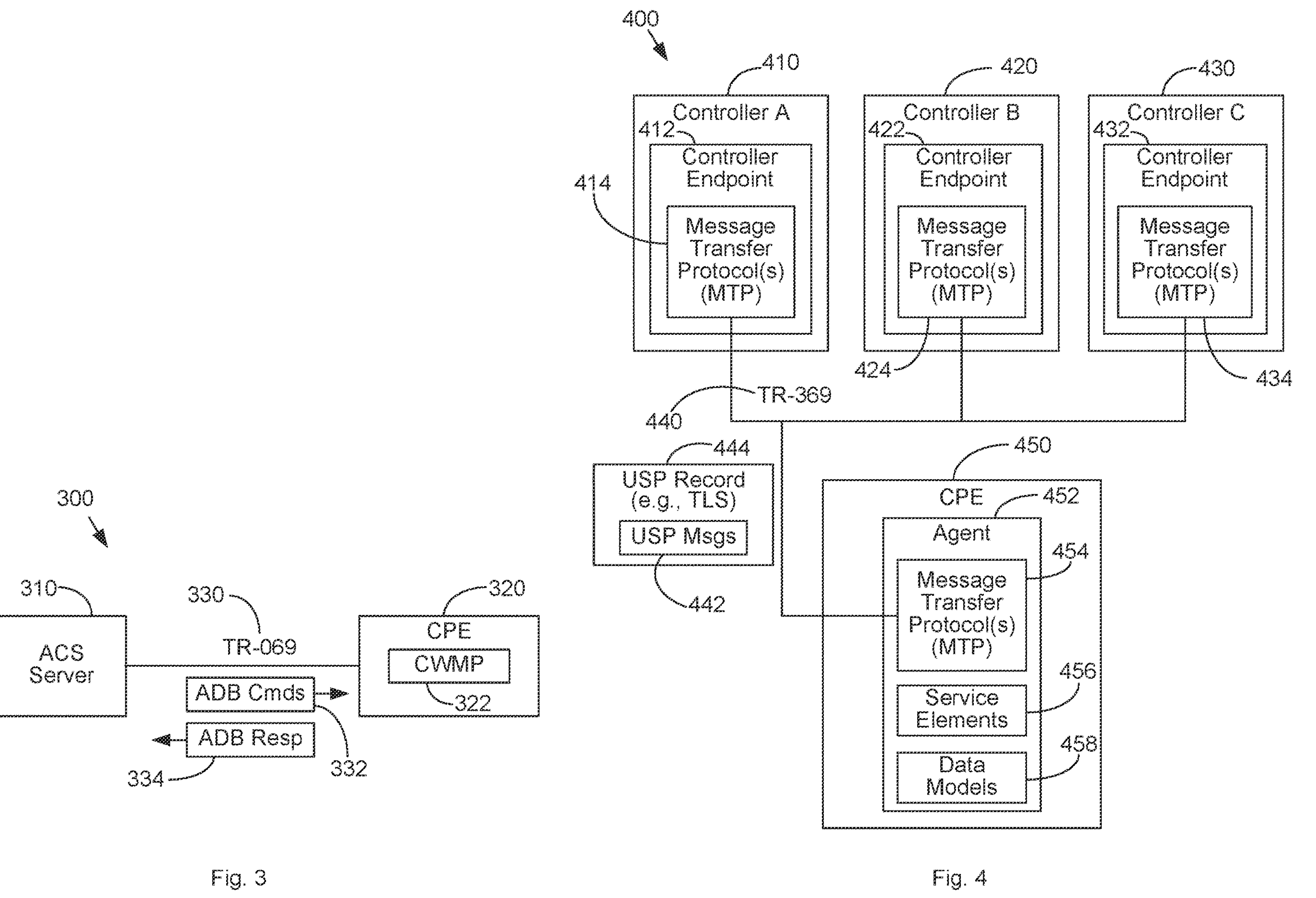
FIG. 3 illustrates operation of the TR-069 (Technical Report 069) protocol for CPE wide area network (WAN) Management Protocol (CWMP).
FIG. 4 illustrates operation of the TR-369 (Technical Report 369) protocol for User Services Platform (USP).

FIG. 3 illustrates operation of the TR-069 (Technical Report 069) protocol for CPE wide area network (WAN) Management Protocol (CWMP) 300.

In FIG. 3, an Auto-Configuration Server (ACS) 310 communicates with a CPE 320 using the TR-069 protocol 330. TR-069 describes a protocol for communication between a CPE 320 and ACS 310 that encompasses secure auto-configuration as well as other CPE management functions within a common framework. A CWMP Client Endpoint 322 is used by the CPE 320 for session communication with the ACS 310. The CWMP/TR-069 protocol 330 prevents tampering with the transactions that take place between the CPE 320 and ACS 310, provide confidentiality for these transactions, and allow various levels of authentication. To provide for execution of Android Debug Bridge (ADB) Commands 332, the ADB Commands 332 are tunneled from the ACS 310 to the CPE 320 (e.g., a STB) via CWMP/TR-069 communications link 330. The CWMP Client Endpoint 322, via the CWMP/TR-069 communications link 330 is used to transparently tunnel any/all ADB Commands 332 from the ACS 310 to the CPE 320, and the ADB Response 334 back from the CPE 320 to the ACS 310. The inherently privileged (trusted) security level associated with the CWMP Client Endpoint 322 on the CPE 320 will enable the highest level of ADB capability. The same mechanism can be applied to other operating systems of CPEs 320 that offer a command line based environment which can be remotely accessed via a secure tunnel formed by the CWMP/TR-069 communications link 330.

Wrapping (or tunnelling) ADB Commands 332 will allow operators of ACS 310 to inherently support a vast range of debug and maintenance commands that are supported by the ADB "intent" mechanism. Wrapping (or tunnelling) ADB Commands 332 will allow access to any and all valid "intent" commands on the CPE 320 that can directly action many functional aspects of the user experience. A few examples of such commands include launching a specific application on the CPE 320 to start, accessing a particular settings menu on the CPE 320, remotely navigating menus on the CPE 320 with commands that replicate Repository Configuration Utility (RCU) keys, such as up/down, left/right, OK, etc., invoking a specific journey of an application that can be started on the CPE 320, e.g., Bluetooth pairing, and triggering a request for a software update check from the CPE 320.

The inherently privileged (trusted) security level associated with the CWMP Client Endpoint 322 on the CPE 320 will enable the highest level of ADB capability to be performed, which is analogous to a local ADB session with "root" capability subject to what is allowed by the Android operating system on the CPE 320. This tunnelling mechanism avoids having to individually implement support on the ACS 310 and CPE 320 for individual commands to be acted upon by the CPE 320, such as "reboot" and "factory reset."

Wrapping (or tunnelling) ADB Commands 332 will transparently enable any ADB "intent" command to be remotely invoked by the operator of the ACS 310 as part of a customer care workflow or other operations scenario. Wrapping (or tunnelling) ADB Commands 332 may also be applied to other operating systems of CPEs 320 that offer a command line based environment, which can be remotely accessed via a secure tunnel formed by the CWMP/TR-069 communications link 330.

However, from a practical standpoint, it is expected there may be some limitations presented by what type of commands can be remotely activated because some will potentially create a large amount of text based response. To address this issue, a file may be created by the CWMP Client Endpoint 322 with this data, which then could be retrieved at a subsequent time by other existing ACS methods for retrieving files from the CPE 320. Further, Android TV based CPEs 320 (e.g., STBs) have many potential ADB "intent" commands, and enabling a means to tunnel these as part of the session using the CWMP/TR-069 communications link 330 provide ACS 310 a distinct operational advantage in terms of remotely assisting and troubleshooting CPEs 320 of customers with service affecting issues that is not currently available.

FIG. 4 illustrates operation of the TR-369 (Technical Report 369) protocol for User Services Platform (USP) 400.

In FIG. 4, USP Controllers 410, 420, 430 include Controller Endpoints 412, 422, 432, respectively. A CPE 450 includes an Agent 452 for communicating with Controller Endpoints 412, 422, 432 of Controllers 410, 420, 430, respectively. Whereas with CWMP there is only one ACS per CWMP Client Endpoint, with the TR-369 protocol multiple Controller Endpoints 412, 422, 432 with different permission settings that can be subscribed to an Agent 452. With CWMP, the connection between the CWMP Client Endpoint and the ACS is always initiated by the CWMP Client Endpoint for a specific purpose and optimized to be as short as possible. However, TR-369 provides for an always-on, direct communication. Once the TR-369 Connection 440 is established at the start-up, sessions are open indefinitely and the Controller Endpoints 412, 422, 432 can freely send messages to Agent 452.

Controller Endpoints 412, 422, 432 support multiple Message Transport Protocols (MTPs) 414, 424, 434. Likewise, Agent 452 supports MTPs 454. Thus, Controller Endpoints 412, 422, 432 and Agent 452 support several types of protocols other than HTTP. These include Websockets, Constrained Application Protocol (CoAP), Simple Text-Oriented Messaging Protocol (STOMP) and Message Queuing, Telemetry Transport (MQTT), etc.

USP messages 442 are wrapped in a USP record 444 which can be encrypted with TLS. USP messages 442 may also be secured in MTPs 454 which supports at least one of several protocols to secure USP Messages 442. TR-369 protocol 440 relies heavily on Data Models 458, in particular on slightly modified Device:2 Root (TR-181) data model, version 1 of which was applied to TR-069. Broadband Forum's TR-181 specification defines it as a set of data objects, such as "basic device information, time-of-day configuration, network interface and protocol stack configuration, routing and bridging management, throughput statistics, and diagnostic tests." Since network interfaces and protocols are considered objects, they can be freely stacked to match the device configuration. USP Agent 452 exposes Service Elements 456 to one or more c Controller Endpoints 412, 422, 432. Data Models 458 of Agent 452 represents the complete set of Service Elements 456 the Agent 452 is capable of exposing to Controller Endpoints 412, 422, 432. Data Models 458 is defined by the union of all of the Device Type Definitions the Agent 452 exposes to the Controller Endpoints 412, 422, 432. Service Elements 456 are made up of a set of objects and parameters that model a given service, such as network interfaces, software modules, device firmware, remote elements proxied through another interface, virtual elements, or other managed services.

The USP Record Message 444 is defined as the Message Transfer Protocol (MTP) payload, encapsulating a sequence of datagrams that comprise the USP Message 442 as well as providing additional metadata needed for integrity protection, payload protection and delivery of fragmented USP Messages 442. Additional metadata fields are used to identify the end-to-end (E2E) session context, determine the state of the segmentation and reassembly function, acknowledge received datagrams, request retransmissions, and determine the type of encoding and security mechanism used to encode the USP Message 442.

Thus, similar to TR-069, TR-369 440 provides for execution of commands, such as Android Debug Bridge (ADB) commands from Controller Endpoints 412, 422, 432 at Agent 452. ADB commands may be tunneled between one of the Controller Endpoints 412, 422, 432 and the Agent 452 of CPE 450 (e.g., a STB) via a USP communications link using TR-369 440. Any response from the Agent 452 of CPE 450 may also be tunneled to Controller Endpoints 412, 422, 432 via a USP communications link using TR-369 440. The same mechanism can be applied to other operating systems of CPEs 450 that offer a command line based environment which can be remotely accessed via a secure tunnel formed by the TR-369 communications link 440. Wrapping (or tunnelling) ADB commands as USP Messages 442 will allow operators of Controllers 410, 420, 430 to inherently support a vast range of debug and maintenance commands that are supported by the ADB "intent" mechanism. Wrapping (or tunnelling) USP Messages 442 will allow access to any and all valid "intent" commands on the CPE 450 that can directly action many functional aspects of the user experience.

Figure 5:
FIG. 5 is a flow chart of a method for preserving Quality of Service (QoS) markings for application in a downstream flow.
Figure 5:
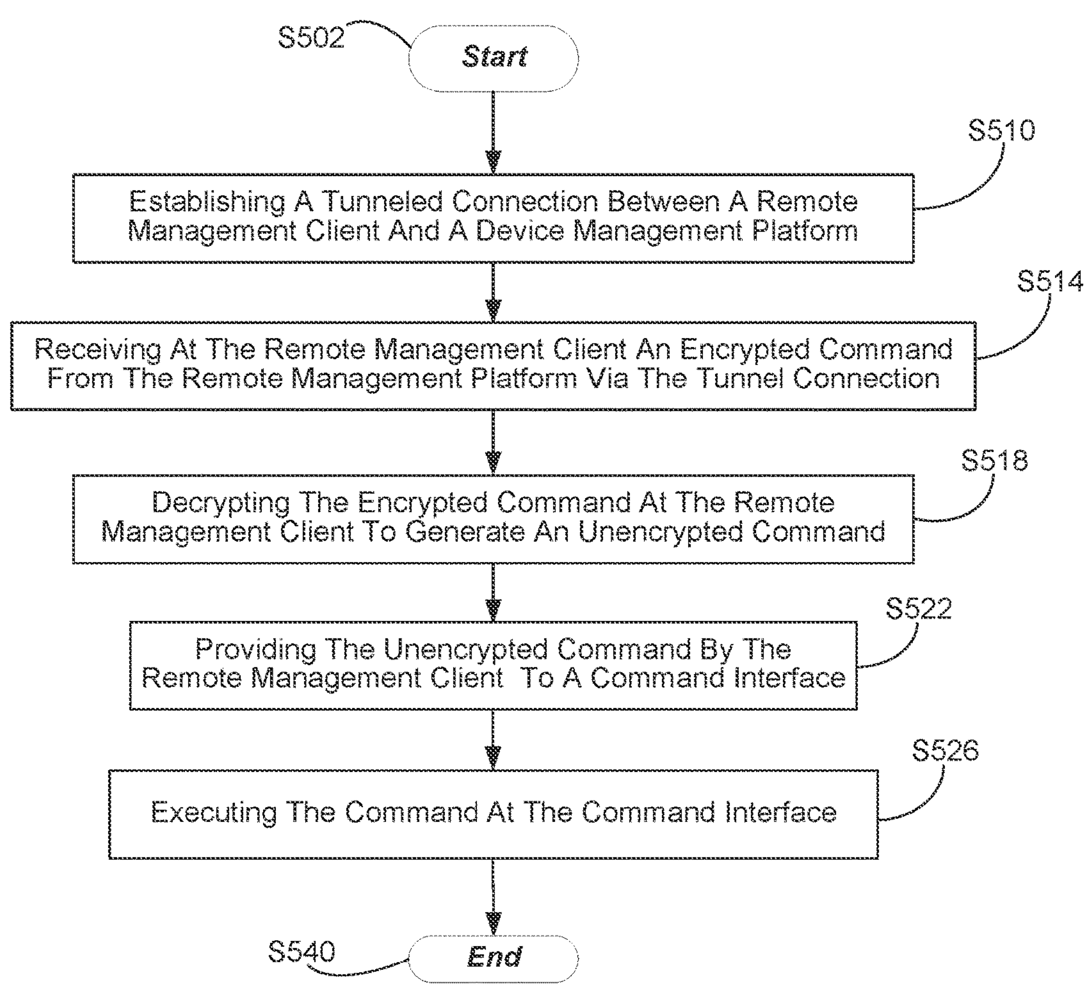

FIG. 5 is a flow chart of a method 500 for preserving Quality of Service (QoS) markings for application in a downstream flow.

In FIG. 5, method 500 starts (S502), and a tunneled connection between a remote management client and a device management platform is established (S510). For example, as described with respect to at least FIG. 1, packets may be sent or received over a Tunneled Connection 172, such as a TR-069 or TR-369 connection. TR-069 describes a protocol for communication between a CPE 110 and Controller 182, i.e., ACS. The TR-069 Tunneled Connection 172 provide confidentiality for these transactions, and allow various levels of authentication. To provide for execution of Android Debug Bridge (ADB) commands, the ADB commands are tunneled from the ACS 182 to the CPE 110 (e.g., a STB) via the TR-069 Tunneled Connection 172. The same mechanism can be applied to other operating systems of CPEs 110 that offer a command line based environment which can be remotely accessed via a secure tunnel formed by the TR-069 Tunneled Connection 172. The Tunneled Connection 172 may also be implemented according to the TR-369 protocol. The TR-369 protocol provides for multiple controllers endpoints, e.g., User Services Platform Controllers of Controller 182, with different permission settings that can be subscribed to by USP Agent, i.e., Remote Management Client/Agent 130. Once a TR-369 Tunneled Connection 172 is established at the start-up, sessions are open indefinitely and the User Services Platform Controllers of Controller 182 can freely send messages to USP Agent, i.e., Remote Management Client/Agent 130. USP messages are wrapped in a USP record can be encrypted with TLS. USP messages may also be secured at Controller 182 in MTPs, which support at least one of several protocols to secure USP Messages. The same mechanism can be applied to other operating systems of CPEs 110 that offer a command line based environment which can be remotely accessed via a secure tunnel formed by the TR-369 Tunneled Connection 172

Next, an encrypted command is received at the remote management client from the device management platform via the tunnel connection (S514). For example, as described with respect to at least FIG. 1, to be able to process commends at Command Interface 140, encrypted command message are received by CPE Device 110 at LAN Network Interface 156 from one or more Controllers of Device Management Platform 180.

The encrypted command is decrypted (unwrapped) at the remote management client to generate an unencrypted command (S518). For example, as described with respect to at least FIG. 1, commands, such as ADB commands, are tunneled from Device Management Platform 180 to CPE 110, where Remote Management Client/Agent 130 unwraps/decrypts the commands.

The unencrypted command is provided by the remote management client to a command interface (S522). For example, as described with respect to at least FIG. 1, Remote Management Client/Agent 130 provides the unwrapped/decrypted command to Command Interface 140.

The command is then able to be executed at the command interface (S526). For example, as described with respect to at least FIG. 1, the Command Interface 140 may then execute the unwrapped/decrypted command provided the Command Interface by the Remote Management Client/Agent 130.

The method then ends (S540).

Figure 6:
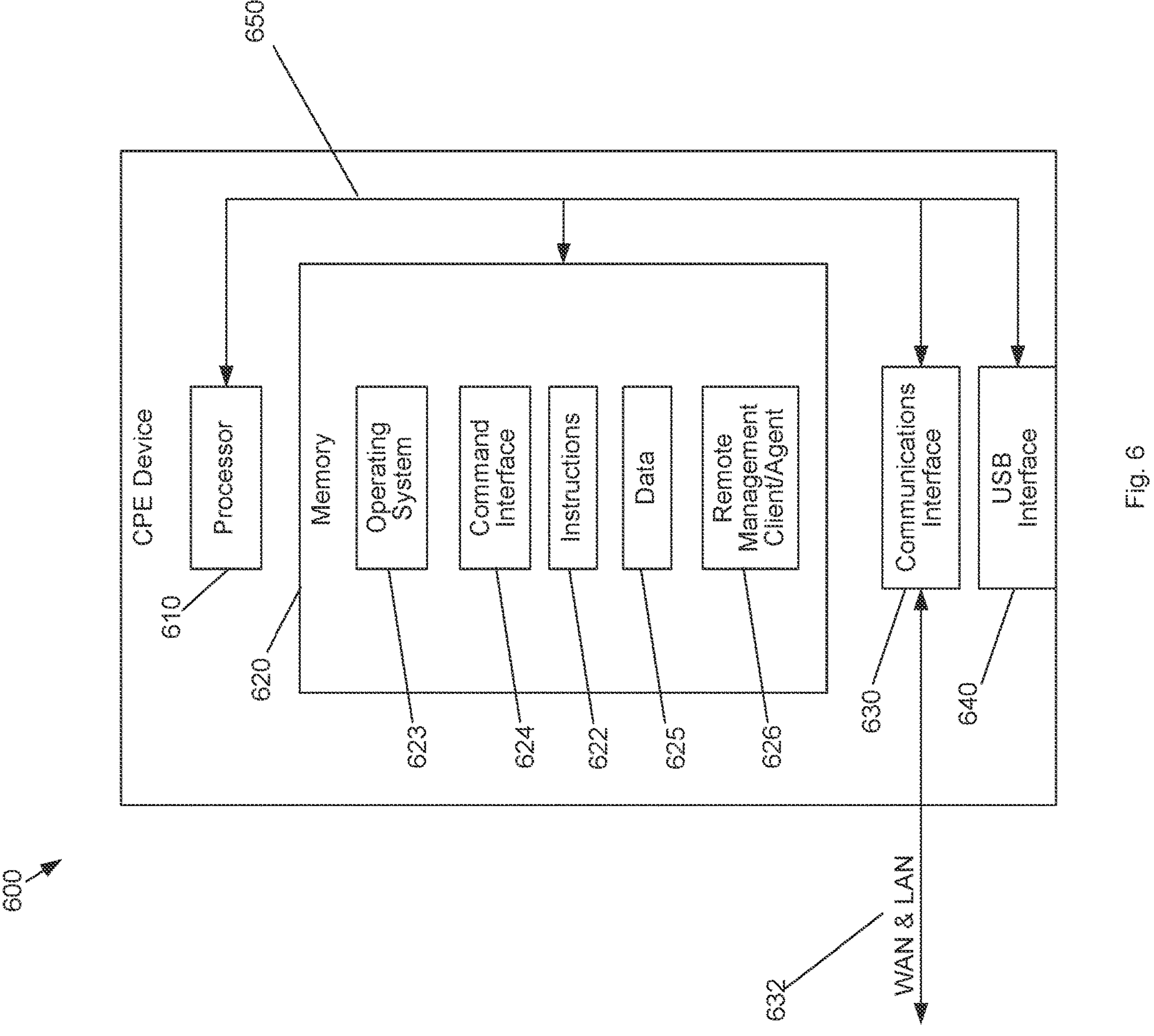
FIG. 6 illustrates a block diagram of a CPE.

FIG. 6 illustrates a block diagram of a CPE 600.

In FIG. 6, non-limiting examples of CPE 600 may include set-top boxes (STBs), smart media devices (SMDs), routers, network switches, residential gateways (RG), high-speed cable modems, extenders, fixed mobile convergence products, home networking adapters and Internet access gateways, digital subscriber line (DSL) or other broadband Internet routers, VoIP stations, etc. In FIG. 6, CPE 600 includes a Processor 610, Memory 620, Communication Interface 630, including Radios/Transceivers, and a Universal Serial Bus (USB) Interface 640. Processor 610, memory 620, Communications Interface 630, and USB Interface 640 communicate via link or bus 650. Communications Interface 630 receives and transmits data via connection 632. Connection 632 may be a wireless or wired connection and may be a fronthaul connection or a backhaul connection. USB Interface 640 provides local communication between CPE 110 and other computers and peripheral devices, such as cell phones, printers, accessories, etc. USB Interface 640 is operates according to the USB standard, which defines cables, connectors and protocols for connection, communication, and power supply interfacing.

Processor 610 executes instructions 622 in Memory 620 to implement operation of CPE 600 including control of operation of Command Interface 624, Remote Management Client/Agent 626, Communication Interface 630, and USB Interface 640 to provide connections to other devices, including gateways, cable modems, routers, and local hosts (e.g., cell phones, tablet computers, personal computers, laptop computers, etc.). Communication Interface 630 may support communication with a device management platform via Connection 632, which may be a tunneled connection. Processor 610 also executes Instructions 622 in Memory 620 to implement an Operating System 623, a Command Interface 624. Memory 620 may stored data 625, which may be the result of executing commands, such as ADB command received over tunneled connection via Connection 632. Processor 620 may also execute instructions 622 to implement a Remote Management Client/Agent 626 according to TR-069 or TR369 as described herein. However, those skilled in the art will recognize that other protocols may be used to provide tunneling of commands to CPE 600. Those skilled in the art will also understand that FIG. 6 illustrates only one example of a CPE 600, and that other configurations or designs may be possible, including configurations or designs for additional components.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions.

Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A customer premise equipment device, comprising:

a memory storing computer-readable instructions; and a processor configured to execute the computer-readable instructions to provide:

a remote management client configured to: (i) establish a tunneled connection with a device management platform via a local area network (LAN) interface of the customer premise equipment device; (ii) provide session communication with the device management platform using a Customer Premise Equipment (CPE) Wide Area Network (WAN) Management Protocol (CWMP) client provided by the remote management client such that the tunneled connection is initiated by the CWMP client; (iii) receive an encrypted command from the device management platform via the tunneled connection and the LAN interface; (iv) decrypt the encrypted command to generate an unencrypted command; and (v) send a response to the device management platform based on the encrypted command; and a command interface configured to: (i) receive the unencrypted command from the remote management client; and (ii) execute the unencrypted command, wherein the unencrypted command is invoked based on a command file created by the CWMP client that is comprised of Android Debug Bridge (ADB) commands, wherein:

the command interface comprises an ADB;

the encrypted command specifies a predetermined Internet Protocol (IP) port for the ADB;

the encrypted command comprises an ADB shell command and an ADB intent command; and the response comprises an ADB response.

2. The customer premise equipment device of claim 1, wherein the management client is configured to receive the encrypted command via a TR-069 (Technical Report 069) protocol or a TR-369 (Technical Report 369) protocol.

3. The customer premise equipment device of claim 1, wherein the remote management client comprises a user services platform (USP) agent.

4. The customer premise equipment device of claim 1, wherein:

the tunneled connection is a first tunneled connection;

the remote management client is configured to establish a second tunneled connection with the device management platform via the LAN interface; and the second tunneled connection comprises a USP communications connection.

5. The customer premise equipment device of claim 1, wherein the encrypted command comprises a security wrapped command.

6. The customer premise equipment device of claim 1, wherein the device management platform comprises a controller configured to provide an auto-configuration server (ACS) or a USP controller.

7. The customer premise equipment device of claim 1, wherein the remote management client is configured to store data retrieved by the command interface for later retrieval.

8. A method for providing execution of remote management commands at a customer premise equipment device, the method comprising:

establishing a tunneled connection between a remote management client and a device management platform via a local area network (LAN) interface of the customer premise equipment device;

providing session communication with the device management platform using a Customer Premise Equipment (CPE) Wide Area Network (WAN) Management Protocol (CWMP) client provided by the remote management client such that the tunneled connection is initiated by the CWMP client;

receiving, at the remote management client, an encrypted command from the device management platform via the tunneled connection and the LAN interface;

decrypting the encrypted command at the remote management client to generate an unencrypted command;

providing the unencrypted command by the remote management client to a command interface;

executing the unencrypted command at the command interface, wherein the unencrypted command is invoked based on a command file created by the CWMP client that is comprised of Android Debug Bridge (ADB) commands; and sending a response to the device management platform based on the encrypted command, wherein:

the command interface comprises an ADB;

the encrypted command specifies a predetermined Internet Protocol (IP) port for the ADB;

the encrypted command comprises an ADB shell command and an ADB intent command; and the response comprises an ADB response.

9. The method of claim 8, wherein the encrypted command is received from the device management platform via the tunneled connection via a TR-069 (Technical Report 069) protocol or a TR-369 (Technical Report 369) protocol.

10. The method of claim 8, wherein the remote management client comprises a user services platform (USP) agent.

11. The method of claim 8, wherein the encrypted command comprises a security wrapped command.

12. The method of claim 8, wherein the tunneled connection is established between the remote management client and a controller providing an auto-configuration server (ACS) or a USP controller.

13. A non-transitory computer-readable medium having computer readable instructions stored thereon, which when executed by a processor cause the processor to perform operations comprising:

establishing a tunneled connection between a remote management client and a device management platform via a local area network (LAN) interface associated with the remote management client;

providing session communication with the device management platform using a Customer Premise Equipment (CPE) Wide Area Network (WAN) Management Protocol (CWMP) client provided by the remote management client such that the tunneled connection is initiated by the CWMP client;

receiving, at the remote management client; an encrypted command from the device management platform via the tunneled connection and the LAN interface;

decrypting the encrypted command at the remote management client to generate an unencrypted command;

providing the unencrypted command by the remote management client to a command interface;

executing the unencrypted command at the command interface, wherein the unencrypted command is invoked based on a command file created by the CWMP client that is comprised of Android Debug Bridge (ADB) commands; and sending a response to the device management platform based on the encrypted command; wherein:

the command interface comprises an ADB;

the encrypted command specifies a predetermined Internet Protocol (IP) port for the ADB;

the encrypted command comprises an ADB shell command and an ADB intent command; and the response comprises an ADB response.

14. The non-transitory computer-readable medium of claim 13, wherein the encrypted command is received via the tunneled connection via a TR-069 (Technical Report 069) protocol or a TR-369 (Technical Report 369) protocol.

15. The non-transitory computer-readable medium of claim 13, wherein the encrypted command comprises a security wrapped command.

16. The non-transitory computer-readable medium of claim 13, wherein the tunneled connection is established between the remote management client and a controller providing an auto-configuration server (ACS) or a USP controller.

* * * * *